INVENTOR.
Edward C. Taylor
and August F. Brenneis

INVENTOR.
Edward C. Taylor
and August F. Brenneis
BY M.O.Hayes
ATTORNEY.

UNITED STATES PATENT OFFICE 2,494,595

CABLE BENDING AND TWISTING MACHINE

Edward C. Taylor, Valley Stream, and August F. Brenneis, Brooklyn, N. Y.

Application December 11, 1945, Serial No. 634,340

6 Claims. (Cl. 73—91)

(Granted under the act of March 3, 1883, as amended April 30, 1928; 370 O. G. 757)

This invention relates to a machine for testing cables, and more particularly to a machine for imparting bending and twisting motion to a cable as a test of the working endurance of the cable. The machine is equipped with a counter, means are provided for indicating failure of the cable, and the entire machine is adapted to be placed in boxes where different conditions of temperature, moisture, etc., can be applied during the test.

An object of this invention is to provide an improved machine for testing electric cable by bending or twisting it.

Another object is to provide a machine capable of bending or twisting cable under test.

Another object is to provide a compact machine for testing electric cable by bending and twisting and adapted to operate within a box under temperature and moisture control.

Figure 1:
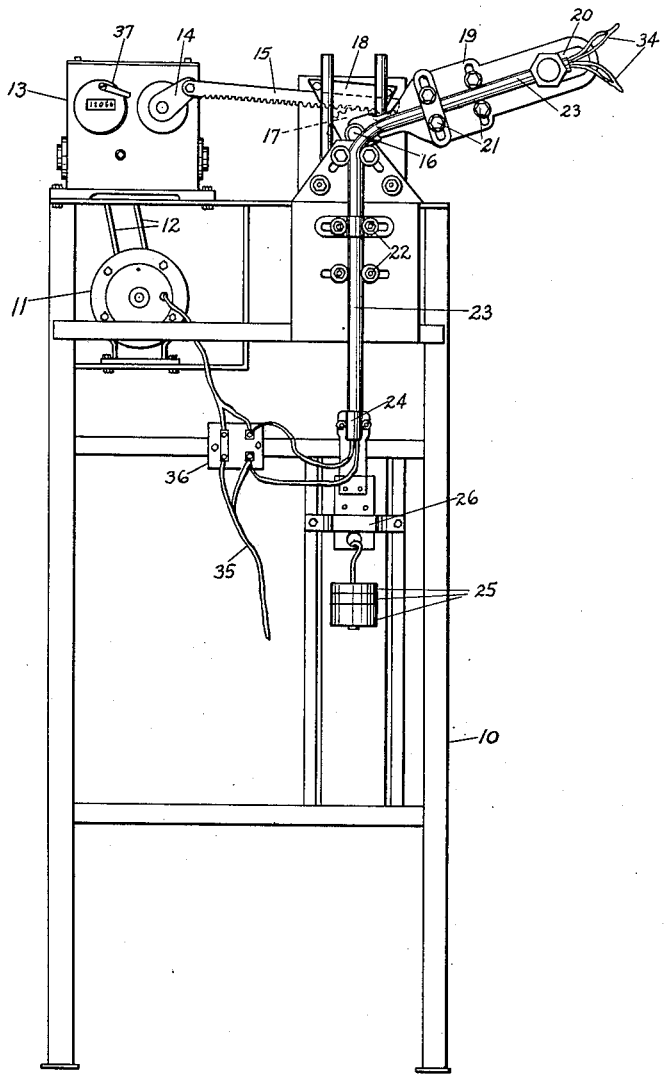
Figure 2:
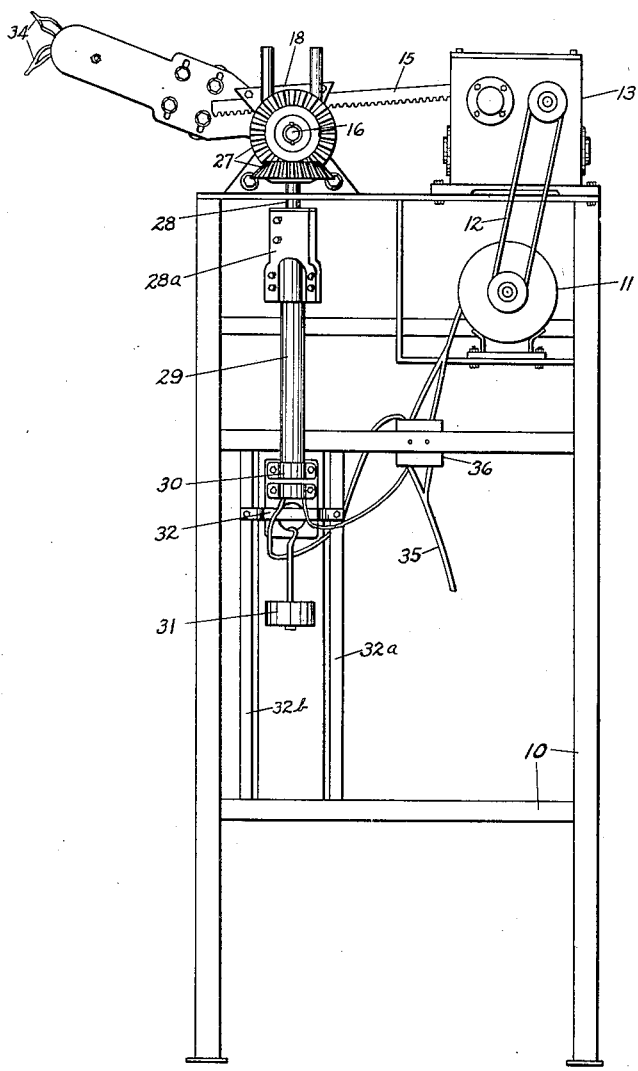

Further objects and advantages of this invention, as well as its construction, arrangement and operation, will be apparent from the following description and claims in connection with the accompanying drawings, in which Fig. 1 is a side elevation of the machine showing the cable under bending test;

Fig. 2 shows the opposite side elevation of the machine and the cable under twisting test.

Similar numerals refer to similar parts throughout the several views.

A frame or base 10 of steel or any other suitable material is the support for all units of the machine. Electric motor 11 furnishes the working power and drives gear-reduction box 13 by means of belt 12. Crank-arm 14 rotated by the gear-reduction mechanism of box 13 imparts reciprocating motion to rack 15.

Rack 15 drives shaft 16 through gear 17 back and forth through an arc of one hundred and eighty degrees. Rack guide-plate 18 is free floating on shaft 16 and holds the rack 15 firmly in mesh with gear 17.

Attached to shaft 16 is bending arm 19, with its cable-clamp 20 and bolts 21. Bolts 22 are attached to frame 10, and cable 23 is shown in place for testing, the lower end being secured by cable-clamp 24 and the required tension obtained by weights 25. Guide 26 serves to keep the cable in alignment.

Attached to shaft 16 is a pair of bevel gears 27 (Fig. 2). Oscillating twisting shaft 28 is secured to the lower bevel gear and clamp 28a is secured at one end to shaft 28. Cable 29 is secured in clamp 28a at one end and by clamp 30 at the other. The desired tension to be placed on cable 29 is obtained with weight 31. The lower clamp 30 is kept from twisting by means of guide 32, which operates in guides 32a and 32b to permit the clamp to rise and fall as the cable shortens and lengthens as it is twisted and untwisted.

In operation the cables are secured in place and their various wires connected in series as indicated at 34 (Fig. 1).

The electric power-supply to motor 11 is carried through wires 35 to a terminal block 36 and then through the cables under test. Therefore, whenever a short circuit or a break occurs within the cable, the test is stopped automatically. A counter 37 operated mechanically by the revolutions of crank arm 14 records the number of complete oscillations of the test.

Various modifications and changes can be made in the subject device without departing from the scope of the invention.

The invention described herein may be manufactured and used by or for the Government of the United States of America for governmental purposes without the payment of any royalties thereon or therefor.

We claim:

1. A testing machine for conductors comprising an electric circuit having the conductor under test in series therewith, a plurality of clamps adapted to secure said conductor in selected position, and electrical means to oscillate at least one of said clamps relative the other clamps, said means being connected in series with said circuit.

2. A testing machine for conductors comprising an electric circuit having the conductor under test in series therewith, a plurality of clamps adapted to secure said conductor in selected position, an electric motor in series with said electric circuit, and a driving linkage between said motor and a selected clamp whereby said selected clamp is adapted to oscillate relative the other clamps.

3. A testing machine for conductors comprising an electric circuit having the conductor under test in series therewith, a plurality of clamps adapted to secure said conductor in selected position, an electric motor in series with said electric circuit, and a rack and gear driving-linkage between said motor and a selected clamp whereby said selected clamp is adapted to oscillate relative the other of said clamps.

4. A testing machine for conductors comprising a supporting frame, an electric motor mounted on said frame, a crank arm driven by said motor, said crank arm carrying a rack, a shaft rotated by said rack, a first clamp carried by said shaft, and a second clamp mounted on said frame, whereby a conductor to be tested can be secured in said clamps and connected in series in the electric circuit of said motor.

5. A testing machine for conductors comprising a supporting frame, an electric motor mounted on said frame, a crank arm driven by said motor, said crank arm carrying a rack, a shaft rotated by said rack, a first clamp carried by said shaft, and a second clamp mounted slidably on said frame, whereby a conductor to be tested can be secured in said clamps and connected in series in the electric circuit of said motor.

6. A testing machine for conductors comprising a supporting frame, an electric motor mounted on said frame, a crank arm driven by said motor, said crank arm carrying a rack, a shaft journaled in said frame and rotated by said rack, a first clamp carried by said shaft, and a second clamp mounted slidably on said frame, whereby a conductor to be tested can be secured in said clamps and connected in series in the electric circuit of said motor, and means to vary the tension on such conductor.

EDWARD C. TAYLOR.
AUGUST F. BRENNEIS.

REFERENCES CITED

The following references are of record in the file of this patent:

UNITED STATES PATENTS

| Number | Name | Date |
|---|---|---|
| 1,458,259 | Wille | June 12, 1923 |
| 1,485,835 | Bothezat et al. | Mar. 4, 1924 |
| 1,660,270 | McAdam, Jr. | Feb. 21, 1928 |
| 1,967,296 | Dixon et al. | July 24, 1934 |
| 2,170,640 | Kenyon | Aug. 22, 1939 |